United States Patent [19]

Haney

[11] 3,754,928
[45] Aug. 28, 1973

[54] APPLICATION OF COMPRESSIVE AND FRICTIONAL FORCES IN PREPARING DUTCHED COCOA

[75] Inventor: John Edwin Haney, Oswego, N.Y.

[73] Assignee: Societe D'Assistance Technique Pour Produits Nestle S.A., La Tour-de-Peilz, Switzerland

[22] Filed: Nov. 22, 1972

[21] Appl. No.: 308,899

Related U.S. Application Data

[63] Continuation-in-part of Ser. No. 56,647, July 20, 1970, abandoned.

[52] U.S. Cl. .......................................... 99/26, 99/23
[51] Int. Cl. .............................................. A23q 1/00
[58] Field of Search .................................. 99/23, 26

[56] References Cited

UNITED STATES PATENTS

| | | | |
|---|---|---|---|
| 3,056,677 | 10/1962 | Colten et al. | 99/26 |
| 3,544,328 | 12/1970 | Dunning et al. | 99/23 X |

*Primary Examiner*—Joseph M. Golian
*Attorney*—Alex Friedman et al.

[57] ABSTRACT

A mixture of cocoa and alkali, containing a small amount of water, is subjected to frictional and compressive forces whereby its temperature is raised rapidly to 200°– 300°F, the mixture held in this range to carry out dutching. The resulting dutched cocoa has improved miscibility. Other features of the invention appear in the Specification.

8 Claims, No Drawings

APPLICATION OF COMPRESSIVE AND FRICTIONAL FORCES IN PREPARING DUTCHED COCOA

CROSS REFERENCE TO RELATED APPLICATION

The present application is a continuation-in-part of the application filed July 20, 1970 having the Ser. No. 56,647 and now abandoned.

BACKGROUND OF THE INVENTION

Traditional methods of dutching cocoa involve contacting batches of cocoa liquor, which contains up to about 55 percent cocoa butter, with an alkali at an elevated temperature for up to 15 hours, depending on the size of the reaction vessel and the temperature. The dutched liquor is then defatted, as by pressing or solvent extraction, and the non-fat fraction of the cocoa bean is ground to provide cocoa powder. The cocoa butter recovered in this operation needs to be deodorized before it can be used in the manufacture of chocolate.

SUMMARY OF THE INVENTION

A mixture of partially defatted cocoa solids and an alkali is put through a device such as a pelletizer or an extruder which develops substantial compression and frictional forces. The dies used are such that the temperature is raised within about 10 seconds to within the temperature range of 200° to about 300°F. The mixture is maintained at this temperature for between 45 seconds and 75 seconds which is sufficient for dutching to occur. Due to the rapidity with which dutching takes place, a substantial reduction of process time occurs with a concommitant reduction in cost. Furthermore, the method is suitable for continuous operation in contrast to the batch processes of the prior art.

An object of the present invention is to provide a continuous process for dutching cocoa, in which the treatment with alkali is completed within a few minutes rather than hours.

A further object of the invention is to provide a process for preparing dutched cocoa which permits natural butter to be obtained from the liquor prior to dutching. By natural butter is meant cocoa butter obtained from liquor which has not been treated chemically (e.g. with alkali) before recovery of the butter.

Still another object to the present invention is to provide a process for the preparation of dutched cocoa in which the costs of the process are reduced.

Yet another object of the present invention is to provide a process for the preparation of dutched cocoa in which the cocoa butter recovered as part of the operation need not be deodorized before it can be used in the manufacture of chocolate.

An important object of the present invention is an improved dutched cocoa.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

DESCRIPTION OF THE PREFERRED EMBODIMENT

The invention generally comprises subjecting a moist mixture of partially defatted cocoa solids and an alkali to compressive and frictional forces whereby the temperature of the mixture is raised to 200° to 300°F. More specifically, the moist mixture may contain from about 4 to 6 parts by weight of water, 100 parts by weight of cocoa, and about 1.5 to 2.5 parts by weight of alkali. The alkali may be any alkaline substance normally used for dutching cocoa liquor, for example, sodium or potassium carbonate. Potassium carbonate is the preferred alkali.

In carrying out the process of the invention, cocoa liquor obtained by grinding roasted cocoa beans is partially defatted in conventional manner, for example by pressing or solvent extraction. The cocoa butter recovered from this operation may be used directly in the manufacture of chocolate. The partially defatted cocoa solids, preferably containing 10 to 13 percent by weight of fat (known as low fat cocoa), are then ground and mixed with appropriate quantities of water and alkali. The water and alkali are conveniently added together as an aqueous solution of the alkali.

The mixture is then subjected to compressive and frictional forces, whereby its temperature rises to 200° to 300°F. This treatment is preferably carried out in an apparatus which frictionally heats and compresses the mixture and extrudes it through a die, such as a pelletizer. A suitable pelletizer is the Astropelleter made in Templewood, England, and distributed in the United States by Daffin Company in Lancaster, Pennsylvania. The die found most useful for the present process is the seven-sixteenth inch die. Other suitable machines are the pellet mill made by California Pellet Mill Company of Crawfordsville, Indiana. The pelletizers, granulators and compactors made by PEECo, of Summit, New Jersey, and the pelletizers made by Sprout Waldron, of Muncy, Pennsylvania are also suitable. Taking the performance of the Astropelleter with a seven-sixteenth inch die as an example the range of times involved in bringing the temperature of the dutching mixture to 200°F. is from 5 to 9 seconds. The treatment time is from 45 to 75 seconds, dependent on the output rate desired. Following are specific examples:

EXAMPLE 1

A dutching mixture put through the Astropelleter with the seven-sixteenth inch die reached 208°F. in 6 seconds. The die was 2 ¼ inches thick. A maximum temperature of 210°F. was reached after 16 seconds in the die. The cocoa passed through the device in 47 seconds. The pellets formed were sent to a breaker and the temperature dropped to 198°F. in about 2 seconds. The production rate was 125 lb/hr.

EXAMPLE 2

Using the Astropelleter again with the same die, a dutching mixture reached 208° in 9 seconds. The maximum temperature reached was 235°F. after 16 seconds. The mixture passed through the die in 72 seconds. The production rate was 85 lbs. per hour. After passing through the breaker, the temperature was 204°F. It should be noted that it is not necessary for the pellets to be broken up prior to drying but it is convenient to do so. Where the mixture is extruded as a rod, it is always preferable to break same into fragments.

It should be understood that the only restriction placed on the apparatus is that it should be capable of subjecting the material to adequate frictional and compressive forces. When the mixture is compressed and extruded its temperature rises because of frictional heating and the heating under pressure promotes the dutching reaction between the cocoa solids and the alkali. It will be observed that the duration of treatment is extremely short, as heating by frictional forces of the type encountered in extrusion, compacting, pelletizing and similar techniques is rapid, so that the desired temperature is reached practically instantaneously, that is, in less than about 10 seconds.

Whilst it is preferred to use low fat cocoa, the process according to the invention may also be applied to cocoa having a higher fat content, for example 16 to 18 percent or more. When using such cocoa, however, care should be taken to ensure that sufficient heat is generated by friction to secure effective dutching as the fat tends to have a lubricating effect. It may therefore be desirable to preheat the cocoa. An increase in the quantity of added alkali could also be indicated.

When the heated, compacted powder leaves the compacting unit the pressure is released and some of the water in the hot mixture evaporates spontaneously so that the product has a moisture content of about 5 percent by weight. On leaving the die the mass may be passed through a breaker or otherwise subdivided to facilitate evaporation. If desired, the moisture content may be further reduced by an after-drying step, advantageously using a fluidized bed drier under conditions such that the temperature of the product does not exceed 180°F.

The mass obtained by dutching may be ground to any desired particle size, before or after the drying step if this is carried out.

The cocoa powder produced by the process of this invention has improved miscibility as compared to dutched cocoa produced by conventional methods, and it may be employed in a large number of formulations. Thus, for example, it may be ground to relatively fine particle size, such as about 120 mesh and mixed with sugar and flavouring materials to provide a cocoa beverage. Preferably, a minor amount of lecithin is also added to improve dispersibility in aqueous liquids. The cocoa powder may be agglomerated with the other constituents by conventional methods such as steam agglomeration or granulation.

The following example is given by way of illustration of the drying and grinding steps. All parts and percentages are by weight.

EXAMPLE 3

One hundred parts of low fat cocoa powder containing 2.28 percent of moisture are mixed with 5.4 parts water containing 2.14 parts of potassium carbonate in solution. The mixture is then passed through an Astro-pelleter as described in Example 1 and pellets of dutched cocoa are obtained having a moisture content of 4.96 percent. The pellets are then dried to a moisture content of about 4 percent in a fluidized bed drier, at a product temerature not exceeding 180°F.

The dried, dutched cocoa is ground to an average particle size of 120 mesh and 19 parts of the ground cocoa powder are mixed with 79 parts of sugar (120 mesh), 1 part of lecithin and 0.4 parts of flavouring materials. The mixture is steam-agglomerated to give a product having an average particle size of 0.19 – 0.20 mm and dried to a moisture content of 0.4 percent.

A cocoa-flavoured beverage mix is obtained having a full dutched cocoa taste and excellent dispersibility in both water and milk.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim

1. A process for producing dutched cocoa, which comprises forming a mixture comprising about 100 parts by weight of partially defatted cocoa solids, 1.5 to 2.5 parts by weight of alkali and 4.5 to 6.0 parts by weight of water, subjecting the mixture to compressive and frictional forces of sufficient intensity to raise its temerature to from 200° to 300°F. within about 10 seconds and maintaining said mixture with said temperature range for about 45 to 75 seconds prior to cooling.

2. A process according to claim 1, in which the alkali is potassium carbonate.

3. A process according to claim 1, in which the mixture is subjected to compressive and frictional forces by extrusion through a die.

4. A process according to claim 3, in which the mixture is extruded as pellets.

5. A process according to claim 3, in which the partially defatted cocoa solids have a fat content of 10 to 13 percent by weight.

6. A process according to claim 1, in which the mixture is dried to a moisture content of about 4 percent by weight after being subjected to compressive and frictional forces.

7. A process according to claim 6, in which the mixture is dried at a product temperature not exceeding 180°F.

8. A process according to claim 1 wherein the temperature of said mixture is raised to between 200° and 300°F. within 5 to 9 seconds.

* * * * *